United States Patent [19]

Coxhead et al.

[11] Patent Number: 5,772,951
[45] Date of Patent: Jun. 30, 1998

[54] MOLDED ARTICLE CONDITIONING AND STORAGE SYSTEM, METHOD AND RESULTING PREFORM

[75] Inventors: Bruce Coxhead, Nobleton; Michael Koch, King City; Robert D. Schad, Toronto, all of Canada; Emery I. Valyi, Katonah, N.Y.

[73] Assignee: Husky Injection Molding Systems Ltd., Canada

[21] Appl. No.: 666,632

[22] Filed: Jun. 18, 1996

[51] Int. Cl.[6] .................................................. B29C 49/68
[52] U.S. Cl. .......................... 264/537; 264/532; 425/526; 425/534
[58] Field of Search ................................ 264/520, 521, 264/532, 537, 535; 425/526, 534

[56] References Cited

U.S. PATENT DOCUMENTS

| | | |
|---|---|---|
| Re. 33,237 | 6/1990 | Delfer, III . |
| Re. 34,177 | 2/1993 | Coxhead et al. . |
| 3,339,230 | 9/1967 | Farrell . |
| 3,932,095 | 1/1976 | Moore . |
| 3,970,421 | 7/1976 | Moore . |
| 3,973,897 | 8/1976 | Berggren et al. . |
| 4,197,073 | 4/1980 | Rees et al. ............................... 425/534 |
| 4,261,949 | 4/1981 | Spurr et al. ............................. 264/532 |
| 4,310,282 | 1/1982 | Spurr et al. . |
| 4,313,905 | 2/1982 | Hafele . |
| 4,522,581 | 6/1985 | Schad et al. . |
| 4,588,370 | 5/1986 | Ichizawa et al. ........................ 425/526 |
| 4,690,633 | 9/1987 | Schad et al. . |
| 4,793,960 | 12/1988 | Schad et al. . |
| 4,959,190 | 9/1990 | Pfeiffer et al. ........................... 264/515 |
| 5,206,039 | 4/1993 | Valyi . |
| 5,352,402 | 10/1994 | Orimoto et al. ........................ 264/521 |
| 5,443,360 | 8/1995 | Lamb et al. . |

FOREIGN PATENT DOCUMENTS

| | | |
|---|---|---|
| 0266804 | 5/1988 | European Pat. Off. . |
| 0534367 | 3/1993 | European Pat. Off. . |
| 0566995 | 10/1993 | European Pat. Off. . |
| 2093396 | 9/1982 | United Kingdom ................... 425/534 |
| 9408776 | 4/1994 | WIPO . |

*Primary Examiner*—Catherine Timm
*Attorney, Agent, or Firm*—Bachman & LaPointe, P.C.

[57] ABSTRACT

An article handling and conditioning system for use between associated machines and associated processes are disclosed. The system comprises at least one initial molding machine and a finishing machine; a device for receiving initially molded articles from the at least one initial molding machine prior to finishing in the finish machine; a first mechanism for accumulating devices for receiving and the initially molded articles; a mechanism for transporting the device for receiving and the initially molded articles from the initial molding machine to the first mechanism for accumulating; a mechanism for moving the devices for receiving and the initially molded articles through the first mechanism for accumulating; and a device for transferring the initially molded articles from the first mechanism for accumulating to the finishing machine.

35 Claims, 13 Drawing Sheets

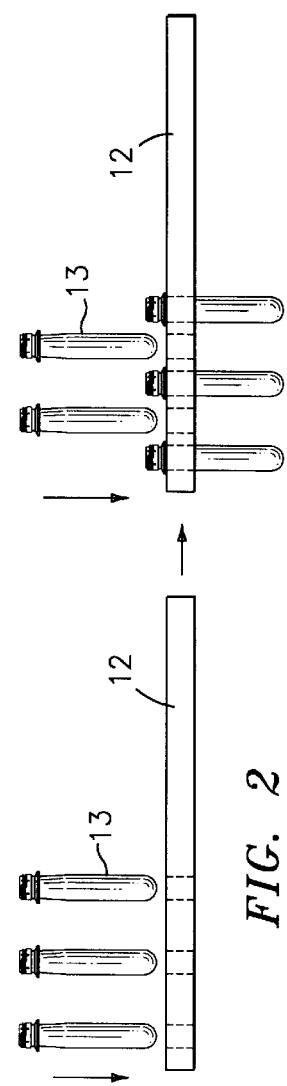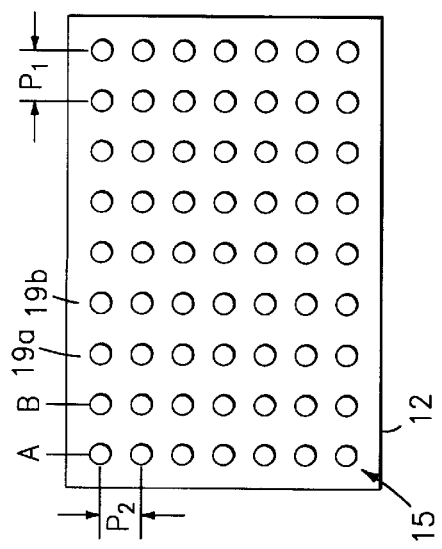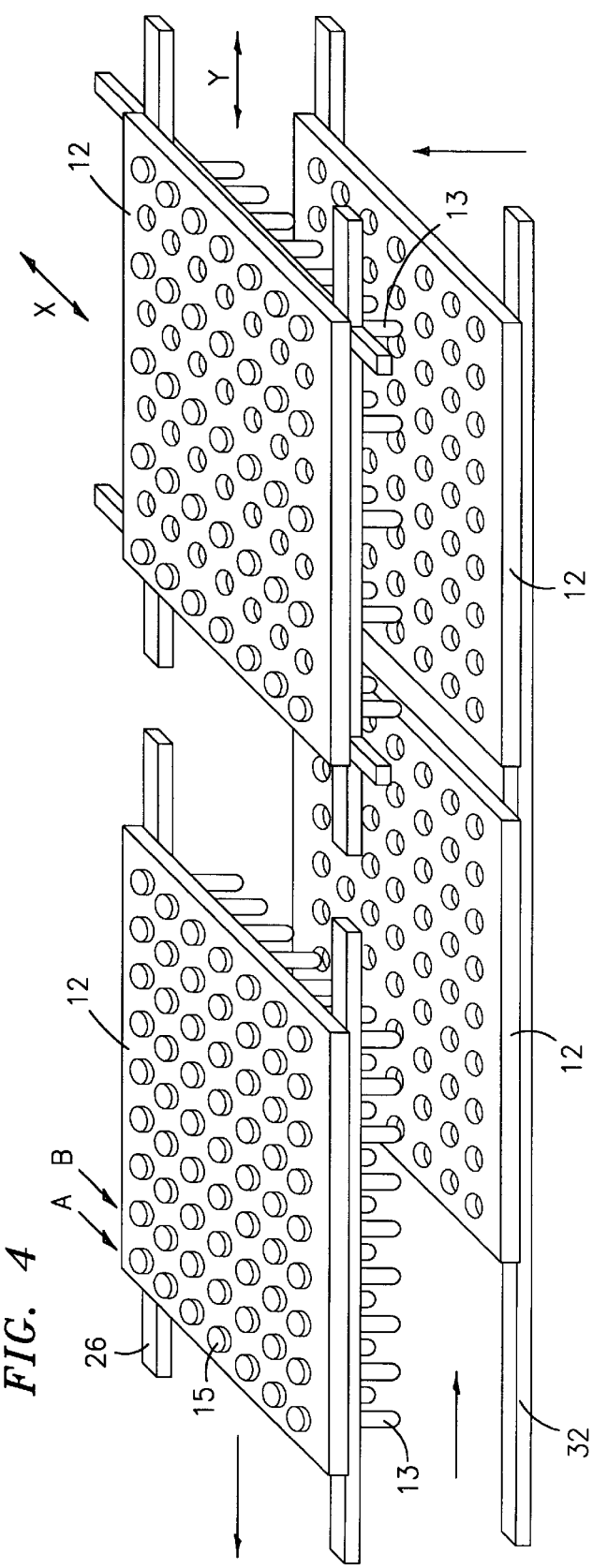

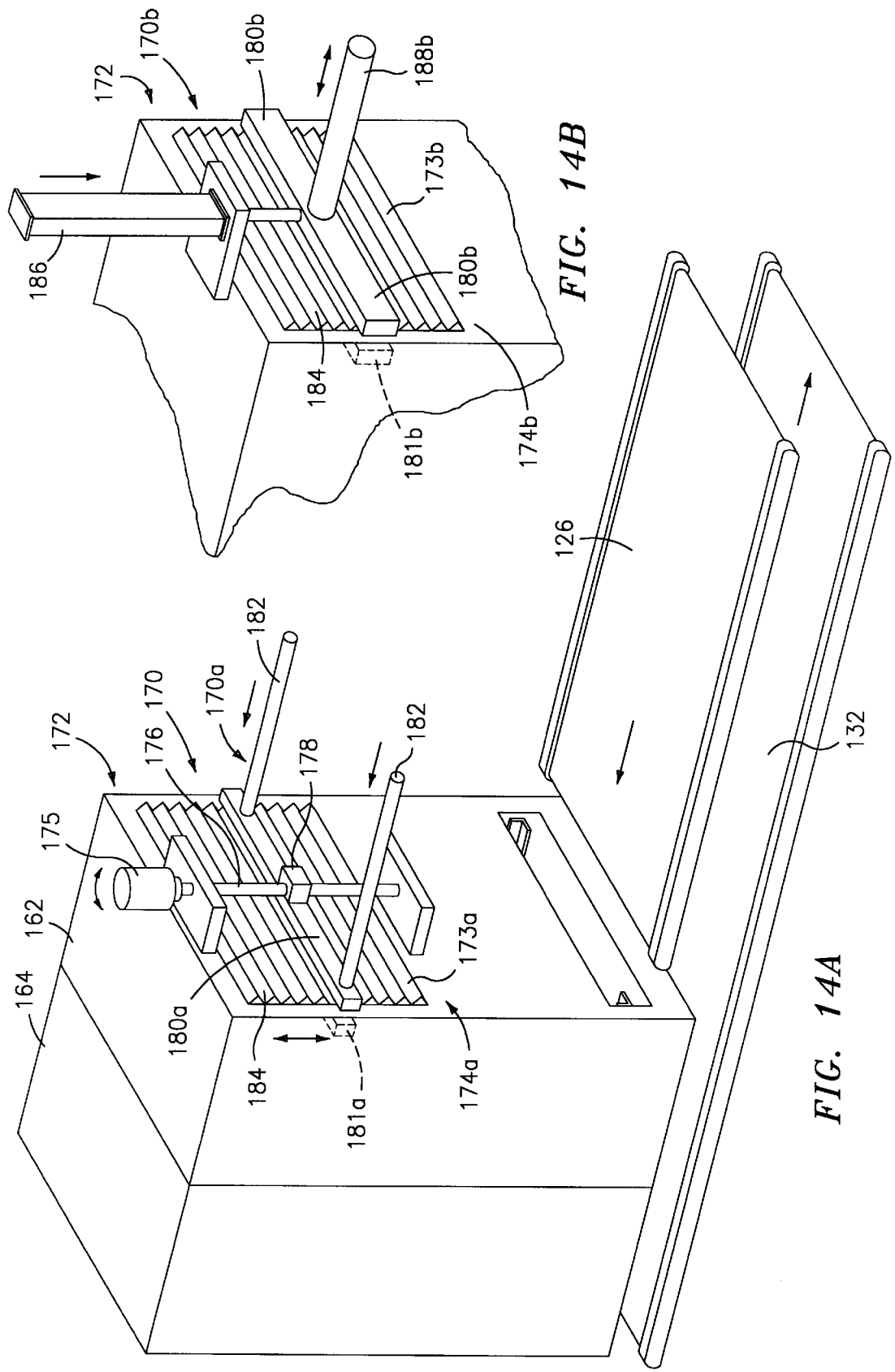

MOLDED ARTICLE CONDITIONING AND STORAGE SYSTEM, METHOD AND RESULTING PREFORM

BACKGROUND OF THE INVENTION

This invention is directed to molded article conditioning and handling, and more particularly, to a system for efficiently handling the transfer of injection molded articles from an injection molding machine to a finishing machine, such as blow molding machine, and for temporarily storing and optionally conditioning the molded articles, whereby idle time of the finishing or blow molding machine is substantially reduced or eliminated.

In the process of making hollow articles such as PET bottles, preforms are first injection molded and typically stored, then reheated and stretch blown into the finished articles. In many cases, manufacturers want to perform these two operations—preform molding and bottle blowing, at the same site and in a sequential and continuous process.

Prior art injection blow molding machines can perform this combined process but have limited production capacities and cycle limitations because equal numbers of preforms are first injection molded and then blow molded. The injection molding process typically takes 4 to 6 times longer than the blow molding process. Accordingly, in a single stage machine that performs both functions, efficient utilization of the equipment is not realized since the blowing unit must remain idle while waiting for the preforms to be injection molded. Typical maximum production rates in these arrangements are 6,000 bottles/hour.

The deficiency of the single stage machine has been overcome by Integrated Two Stage machines of the type embodied in the inventor's U.S. Pat. Nos. 4,522,581 and 4,690,633. These machines employ a conveying means for moving freshly molded preforms through temperature condition ovens prior to blow molding the finished articles. While efficiently employing equipment, this type of machine is still limited in production capacity output having typical maximum production rates of 8,000 bottles/hour.

For very high production rates the two stage approach of separately injection molding preforms and blowing the bottles is performed using two separate specialized pieces of equipment operating at different production rates. Typically a 96 cavity preform injection molding machine can deliver a rate of 17,000 preforms/hour and today's largest reheat blow molding machines bottles can deliver a rate of 60,000 bottles/hour. Typically four injection molding machines supply preforms for one blow molding machine. Currently, production logistics require the preforms to be bulk stored before blowing, and usually bulk transported between injection and blowing locations. This exposes preforms to risk of damage during handling and can require substantial storage space.

There have been prior art attempts to directly couple preform injection molding machines and reheat blow molding machines each having optimized cavitations. However the coupling methods were typically simple conveying devices and when either machine stopped the entire system had to be shut down. In order to minimize disruptions like this manufacturers used small cavitation tooling, typically 32 cavity preform molds, in order to minimize the impact of such a disruption to product output.

The current invention teaches an improved method of coupling multiple high output injection molding machines with high output blow molding machines to optimize the production process at these very high rates of production, while providing the flexibility of buffering preforms should one or more of the units shut down.

Prior art examples of ovens with preform handling means are shown in U.S. Pat. Nos. 3,339,230, 3,932,095, 3,970,421, and 3,973,897. Prior art examples of altering the pitch between preforms during handling are shown in U.S. Pat. Nos. 4,313,905 and 5,443,360. A prior art example of temperature conditioning preforms immediately after injection molding is shown in U.S. Pat. No. Re. 33,237. Inventor's U.S. Pat. No. Re. 34,177 teaches a conditioning oven capable of treating the preform's neck finish area separately from its body.

Also, U.S. Pat. No. 5,206,039 to Valyi discloses an Apparatus for Conditioning Pressure Molded Plastic Articles. The apparatus includes a pressure molding machine for delivering plastic molded articles; a finishing machine for performing a finishing operation upon the articles; a conditioning section operative to adjust the temperature of the articles between the pressure molding machine and finishing machine; a first transporter adapted to remove the articles from the pressure molding machine; and a second transporter adapted to transport articles from the first transporter to the conditioning section. A storage mechanism which may include means for conditioning the articles prior to transfer to the finishing machine, is not shown.

There exists a need, therefore, for a molded article handling machine for use between associated molding machines having different cycle times, which system functions to maximize the cycle time of the most efficient molding machine by including an intermediate section for receiving, storing and optionally conditioning initially molded parts originating from an initial molded article machine.

SUMMARY OF THE INVENTION

The primary object of this invention is to provide an article handling system and method for use between associated molding machines which increases the efficiency of transfer between the associated machines.

Yet another object of this invention is to provide an article handling system and method for use between associated molding machines, which functions to transport, store and redirect, and optionally condition, initially molded articles for increasing the efficiency of transfer between the associated molding machines and forming improved preforms.

Another object of this invention is to provide a molded article handling system and method for use between injection molding machines and a blow molding machine, which receives initially molded parts from one or a plurality of injection molding machines and efficiently transfers the same to the blow molding machine for allowing the blow molding machine to run at its substantially maximum cycle time.

Still another object of this invention is to provide a molded article handling system and method for efficiently transporting initially molded articles from an injection molding machine to a blow molding machine, wherein during transport, the initially molded articles are subject to conditioning.

And still another object of this invention is to provide a molded article handling system and method for efficiently transporting initially molded articles between associated molding machines, which also includes a buffer storage area for diverting the initial molded articles from the transferee molding machine, as necessary.

And yet another object of this invention is to provide a molded article handling system and method for use between associated molding machines, which allows for the continued operation of each of the associated molding machines should the other one of the associated molding machines have to be shut-down.

Still another object of this invention is to provide a molded article handling system and method for transporting molded articles between associated molding machines, which includes means for subjecting first and second portions of the initially molded article to different conditioning parameters for forming molded articles with improved characteristics.

And still another object of this invention is to provide a method for forming preforms having substantially no residual stress.

The objects and advantages of the invention disclosed herein are achieved by the article handling system for use with associated molding machines and the related processes of the present invention.

The article handling and molding system of the present invention comprises at least one initial molding machine and a finishing machine; means for receiving initially molded articles from the at least one initial molding machine prior to finishing in the finishing machine; first means for accumulating the means for receiving and the initially molded articles; means for transporting the means for receiving and the initially molded articles from the initial molding machine to the first means for accumulating; means for moving the means for receiving and the initially molded articles through the first means for accumulating; and means for transferring the initially molded articles from the first means for accumulating to the finishing machine.

The article handling and molding process of the present invention for use with associated initial molding and finishing machines, comprises the steps of molding initially molded articles; removing the initially molded articles from at least one initial molding machine; accumulating the initially molded articles; vertically moving the initially molded articles during the step of accumulating; and transferring the initially molded articles to the finishing machine after the step of vertically moving.

The process of the present invention for forming a preform substantially free of residual stress in preparation for at least one operation in a finishing machine, comprises the steps of molding the preforms in an initial molding machine; removing the preforms from the initial molding machine; accumulating the preforms; conditioning the preforms in the step of accumulating such that the preforms are substantially free of residual stress; moving the preforms during the step of accumulating; and transferring the preforms to the finishing machine after the step of moving.

The details of the present invention are set out in the following description and drawings wherein like reference characters depict like elements.

BRIEF DESCRIPTION OF THE DRAWINGS

FIG. 2 is a schematic elevational view of injection molded articles, in the form of preforms, being inserted into an article receiving and transport plate;

FIG. 3 is an elevational schematic view of the article receiving and transport plate receiving multiple shots of injection molded articles;

FIG. 4 is an overhead view of an injection molded article receiving and transfer mechanism for use in accordance with the principles of the present invention and with the system shown in FIG. 1;

FIG. 5 is a perspective schematic view showing the movement of the injection molded article receiving and transport plates toward and away from the injection molded article molding machine;

FIGS. 14A–14C are perspective views of shuttle plate transfer mechanisms used in the vertical conveying tower shown in FIG. 10;

DETAILED DESCRIPTION OF PREFERRED EMBODIMENT

Figure 1:
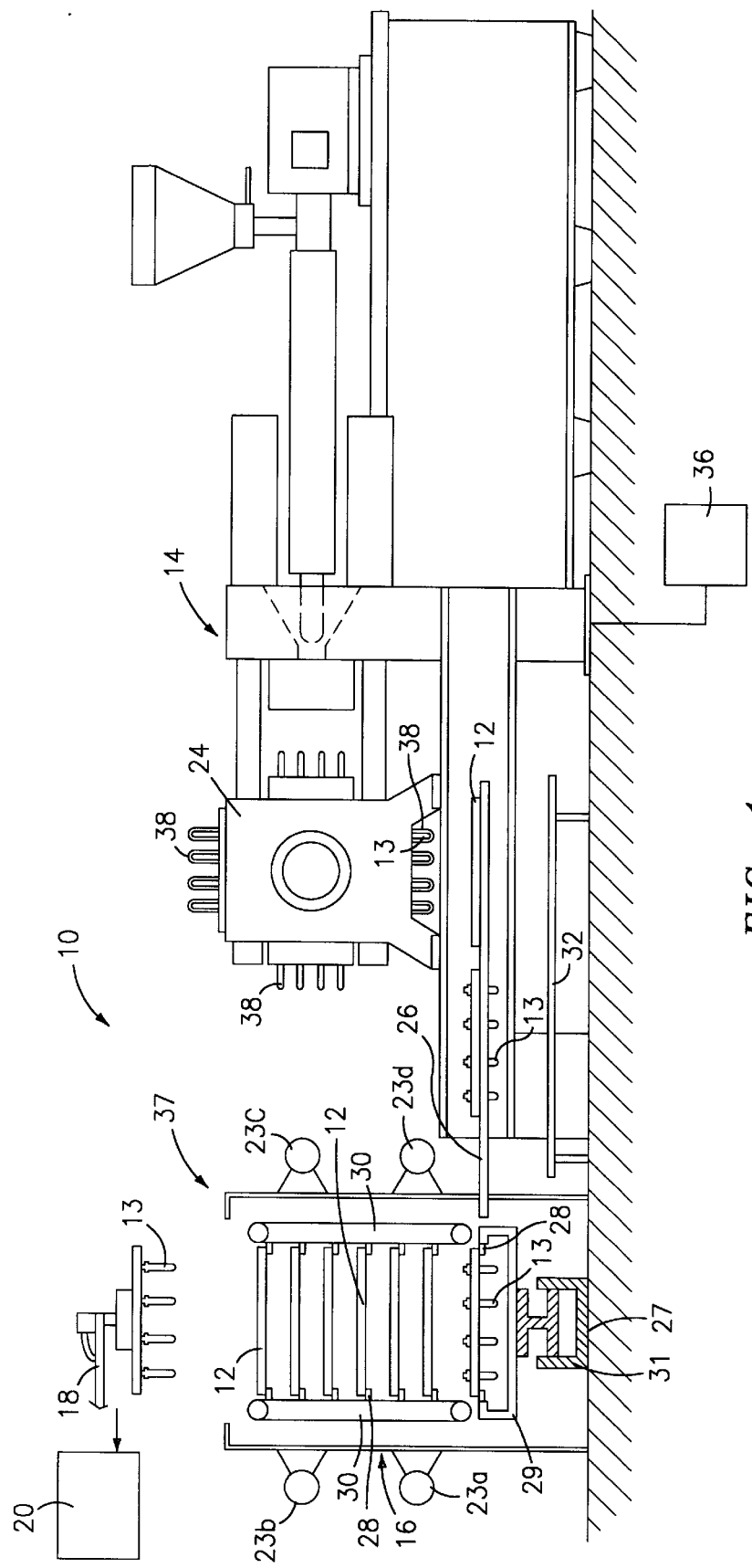
FIG. 1 is a schematic view of the article handling and conditioning system of the present invention, wherein the handling system thereof is shown as being used with a turret style injection molding machine and a blow molding machine.

Referring now to the drawings in detail, there is shown in FIG. 1 an elevational and schematic view of the molded article handling system of the present invention, designated generally as 10. System 10 generally includes shuttle plates 12 for receiving initially molded articles from an initial molding machine, preferably injection molding machine 14, a vertical conveying tower 16 for receiving and accumulating shuttle plates 12 holding molded articles 13, preferably preforms, robot tooling unit 18 for transferring shuttle plates 12 between vertical conveying tower 16 and finishing machine 20, preferably in the form of a blow molding machine (shown schematically), buffer storage rack 22 (shown in FIG. 6), and conditioning devices 23a–23d.

The system described hereinbelow is described as being used with molded articles such as preforms. However, it is to be understood that the system of the present invention can be used with any type of molded article and is accordingly, not limited to use with preforms.

Referring to FIG. 1, system 10, and particularly, shuttle plates 12, are shown schematically as being used with injection molding machine 14. While system 10 can be used with any form of molding machine, preferably the molding machine is an injection molding machine, and most preferably, as shown in FIG. 1, the injection molding machine is in the form of a turret style injection molding machine. While system 10 is described in one embodiment below as for use with the turret style machine, it is to be understood that the intention is not to limit the invention to such. The system can be fitted for use with any style injection molding machine, as discussed further in the FIG. 10 et seq. embodiments.

The details of the turret style injection molding machine for use with the present invention, discussed briefly in the background section, are hereby incorporated by reference to U.S. Pat. No. 5,728,409, assigned to the assignee of the present invention, particularly, with reference to pages 11–30 and the associated figures. Accordingly, in discussing the interaction of system 10 with injection molding machine 14, reference is made where necessary to the features of the turret injection molding machine which are described in greater detail in the incorporated reference.

Referring still to FIG. 1, turret block 24 is operative to release initially molded articles, preferably preforms 13 to shuttle plates 12, as shown schematically in FIGS. 2 and 3.

Referring to FIG. 4, shuttle plate 12 is preferably in the form of a plate having a plurality of holes 15 therein, which holes are densely packed on the plate and arranged in a pattern to receive at least one and preferably multiple shots of initially molded preforms. As shown, at least two shots of initially molded articles may be received by each shuttle plate 12. Accordingly, the pitches P1 and P2 between the holes 15 on shuttle plate 12 are a fractional number multiple of the corresponding pitches of the preform cavities in the injection mold. In the shuttle plate shown in FIG. 4, the first arrangement 19a of holes for receiving the first shot of preforms is defined by every other row of holes, starting with row A. Starting with row B, another row of holes, defines the beginning of second arrangement 19b for receiving a second shot of preforms. Arrangements 19a and 19b include hole patterns arranged in the pattern of the injection mold preform cavities. Accordingly, once the first of arrangements 19a and 19b receives its shot of preforms, shuttle plate 12 is shifted along either or both of the x and y axes to align an empty one of arrangements 19a and 19b with the preforms 13 molded and waiting in injection molding machine 14. As discussed in further detail below, robot 18 is adapted to align with each of the multiple shots for further transference to the blow molder or the like.

Most preferably, each shuttle plate holds six complete shots (not shown), equivalent to approximately two minutes of injection molding machine production so that 15 shuttle plates stored in tower 16 would accommodate 30 minutes of blow molding machine shutdown. The shuttle plates may be formed via stamped metal or molded plastic with various high density hole patterns which are dependent on the preform size and mold cavity layout for holding multiple shots. Robot tooling unit 18 is preprogrammed to adjust to the various hole patterns to align with the plurality of shots.

Referring to FIGS. 1 and 5, shuttle plates 12 are preferably movable into position with turret block 24 for receiving injection molded preforms therefrom and into position with tower 16 for transport to blow molding machine 20, via tracks 26, extending between vertical conveying tower 16 and injection molding machine 14. Shuttle plates 12 are connected and movable on tracks 26 in manners known in the art and are movable into engagement with shuttle plate engagement devices 28, such as movable shelves (specific embodiments shown in FIGS. 13A and 13B), located in conveying tower 16 under the assistance of shuttle plate positioning mechanism 27.

Figures 6, 7:
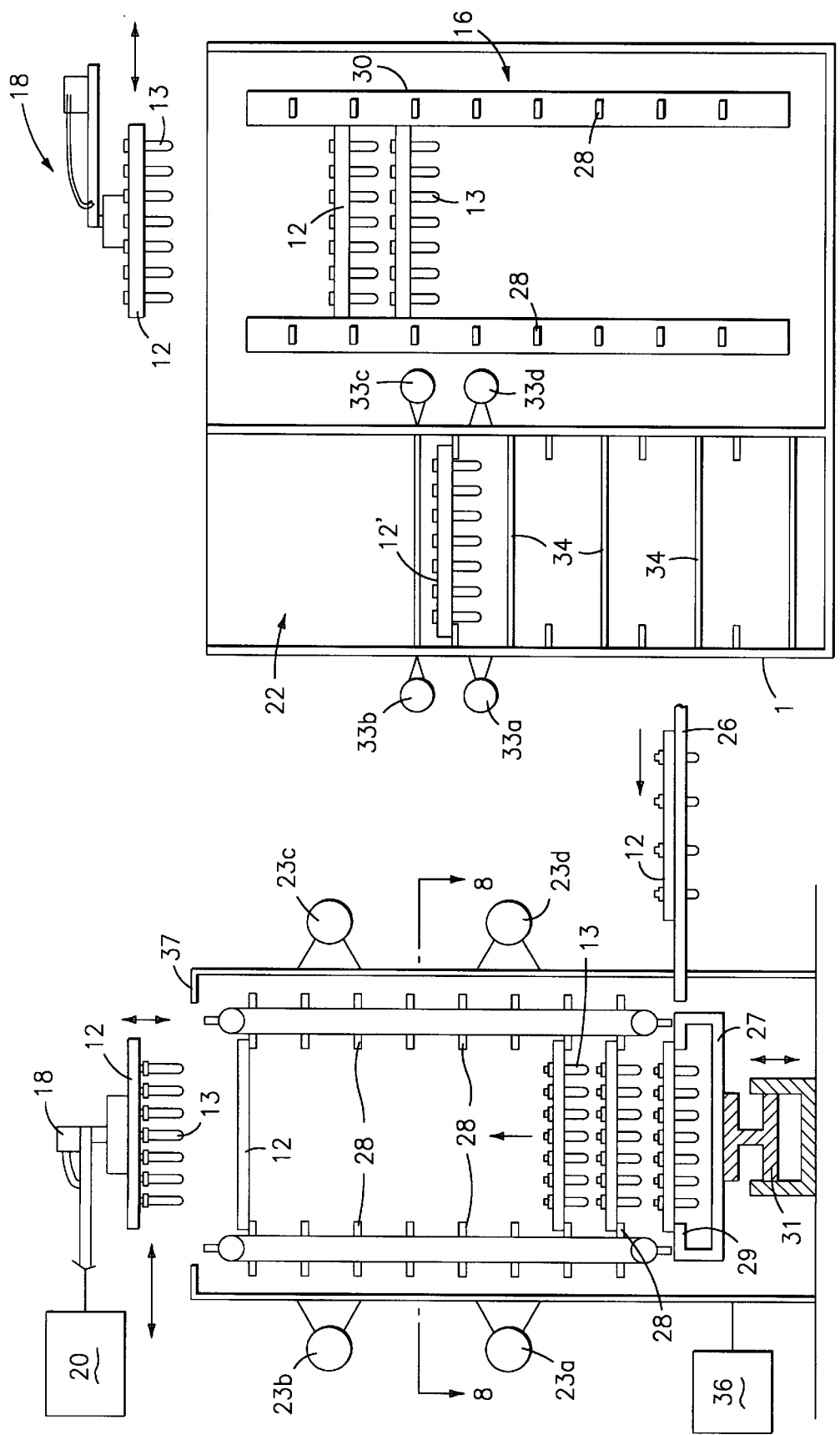
FIG. 6 is a schematic elevational view of the injection molded article storage mechanism for moving the injection molded articles on their transport plates to an associated molding machine.
FIG. 7 is an elevational view of the system shown in FIGS. 1 and 6.

As shown in FIG. 7, shuttle plate positioning mechanism 27 includes means for engaging shuttle plates 12 and means for moving shuttle plates 12 into position for engagement with shuttle plate engagement devices 28. The means for engaging may be in the form of mechanical fingers 29 for engagement with the bottom of shuttle plates 12 and means for moving may be in the form of a fluid or otherwise actuated lift 31. Accordingly, conveying tower 16 is adapted to move shuttle plate engagement devices 28 into alignment with shuttle plate positioning mechanism 27 for the subsequent transfer of shuttle plates 12.

Referring still to FIG. 7, shuttle plate engagement devices 28 are movable upwardly with shuttle plates 12 via drives 30, preferably belt drives, although the particular type of mechanism for which is not critical, and during such vertical movement, initially molded preforms 13 are preferably subject to conditioning via conditioning devices 23a–23d. Conditioning devices 23a–23d are preferably used for thermal conditioning of preforms 13 such as to control and/or prepare the temperature of the preforms for subsequent blow molding via blow molding machine 20. Preferably, the temperature of preforms 13 is conditioned or maintained to exceed ambient temperature such that the heat energy associated with the preforms 13 as they are received from injection molding machine 14 is not wasted and is used to reduce the energy required of the blow molding machine for heating the preforms for blow molding. Conditioning devices 23a–23d may be in the form of conditioning devices known in the art, such as heaters or cool air blowers or fans. While four such conditioning devices are shown, it is to be understood that any number of conditioning devices may be used, as needed.

The vertical conveying tower 16 used is such that the storage capacity thereof can be increased or decreased, by loading shuttle plates 12 into every slot defined by engagement devices 28 under certain conditions or into alternate slots, which may be required under normal running capacity, respectively.

Referring to FIGS. 6 and 7, conventional robot tooling unit 18 is provided at the top of conveying tower 16, the design of which is not critical and is known in the art, and is operational to move shuttle plates 12 with initially molded preforms therein from conveying tower 16a to blow molding machine 20. After one of shuttle plates 12 is free of preforms, it is returned by conventional means by infeed conveying tracks 32 to injection molding machine 14, as shown in FIG. 5.

Figure 8:
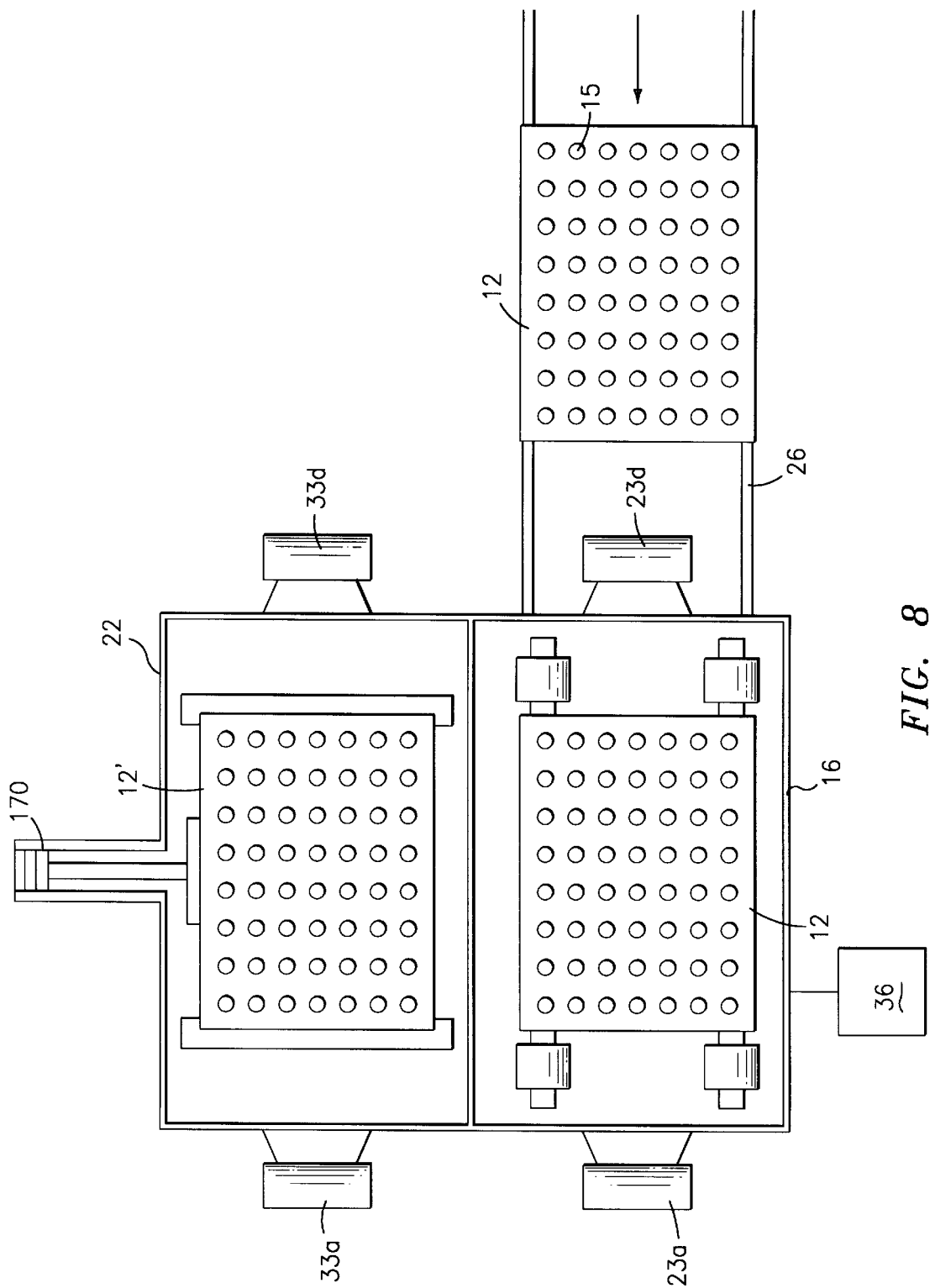
FIG. 8 is a top view of the article handing system of the present invention shown in FIG. 7 which also includes a buffer storage rack for storing injection molded articles if one of the associated molding machines is shut down.

Buffer storage rack 22, as shown in FIGS. 6 and 8, juxtaposed conveying tower 16, is also a vertical conveyor, and is adapted to receive and accumulate shuttle plates 12 with preforms 13 thereon if blow molding machine 20 (shown in FIG. 7) requires shut down, allowing continuous injection molding.

The means for transferring shuttle plates 12 to the buffer storage rack 22 is discussed in detail below with reference to FIGS. 14A–14C, and is shown in FIG. 8 as element 170.

Also, buffer storage rack 22 is adapted to provide access by robot tooling unit 18 to provide stored shuttle plates 12' to blow molding machine 20 when injection molding machine 14 is shut down. Accordingly, by having store shuttle plates 12' on buffer storage rack 22, shut down of one of the associated injection molding and blow molding machines does not effect the operation of the other associated machine which is still operational.

As shown in FIGS. 6 and 8, buffer storage rack 22 also preferably includes conditioning devices 33a–33d, although more can be used, for allowing the conditioning of preforms 13 while in shuttle plates 12' in rack 22. Preferably, the temperature of preforms 13 is conditioned or maintained to exceed ambient temperature such that the heat energy associated with the preforms 13 as they are received from injection molding machine 14 is not wasted and is used to reduce the energy required of the blow molding machine for heating the preforms for blow molding. Preferably, buffer storage rack 22, and optionally vertical tower 16, are provided with internal baffles and seals 34 to allow the preforms on shuttle plates 12 to be individually conditioned with both heated air by conditioning device 33a, preferably in the form of a fan, and cooled air, by another conditioning device 33b, also preferably in the form of a fan.

Accordingly, conditioning device pairs 33b-33a and 33c-33d, and optionally pairs 23b-23a and 23c-23d, are preferably positioned one above the other, as shown, so that they coincide with the neck finish and preform body, respectively. Preferably, the conditioning devices are arranged as a cooling device above a heating device, thereby allowing for the neck finishes of preforms 13 to be maintained at lower temperatures than the bodies of preforms 13. In this manner, the preform necks are cooled to a temperature at which they are not subject to damage in the course of further, normal handling. Also, the bodies of the preforms are slow cooled and maintained at a temperature such that they are not subject to substantial dimensional or structural change, e.g. by crystallizing.

Beneficially, since much of the heat energy associated with bodies of preforms 13 after initial molding is substantially preserved, as a result of maintained conditioning in tower 16 and storage rack 22, improved preforms are achieved. That is, in contrast to the normal practice of chilling preforms as fast as possible, the slow cooled preforms formed by the system and process of the present invention are substantially free of residual stress and therefore in better condition for reheating for blow molding. The preforms formed in accordance with the system and process of the present invention deform controllably in finish operations, resulting in containers with improved orientation and therefore, containers with improved properties.

System 10 also preferably includes a control system 36, shown schematically in FIGS. 1, 7 and 8, which is operable to monitor, control and direct tray positioning and to monitor and control the temperature conditioning of the preforms, for ensuring that all of the preforms are thermally conditioned in substantially the same manner. Also, control system 36 is able to count the preforms and monitor the thermal condition of the exiting preforms to meet preselected values required by blow molding machine 20. Further, control system 36 is also preferably capable of receiving real time input and feedback signals from either or both of the injection and blow molding machines and accordingly, such feedback can be used to responsively alter preform storage quantities and/or flow-through rates and preform thermal conditioning.

While system 10 has been described above for use with one injection molding machine 14, it is to be understood and considered a viable application of the present invention, that multiple injection molding machines can be used to supply preforms for system 10 for subsequent supply to one or multiple blow molding machines. By obtaining input from multiple injection molding machines for one blow molding machine, system 10 is capable of allowing the blow molding machine to run at maximum cycle time since the blow molding machine is not required to wait for a single injection molding machine to finish its molding process. Accordingly, a significant advantage is obtained by using multiple injection molding machines in combination with a single blow molding machine and using system 10 for transferring initially molded articles from the injection molding machines to the blow molding machine for forming finished molded articles. Such an embodiment is shown schematically in FIG. 9, wherein multiple injection molding machines 14a and 14b, each with a tower 16a and 16b and buffer storage areas 22a and 22b, respectively, represented schematically, are shown feeding into a single blow molding machine 20, shown schematically.

Figure 10:
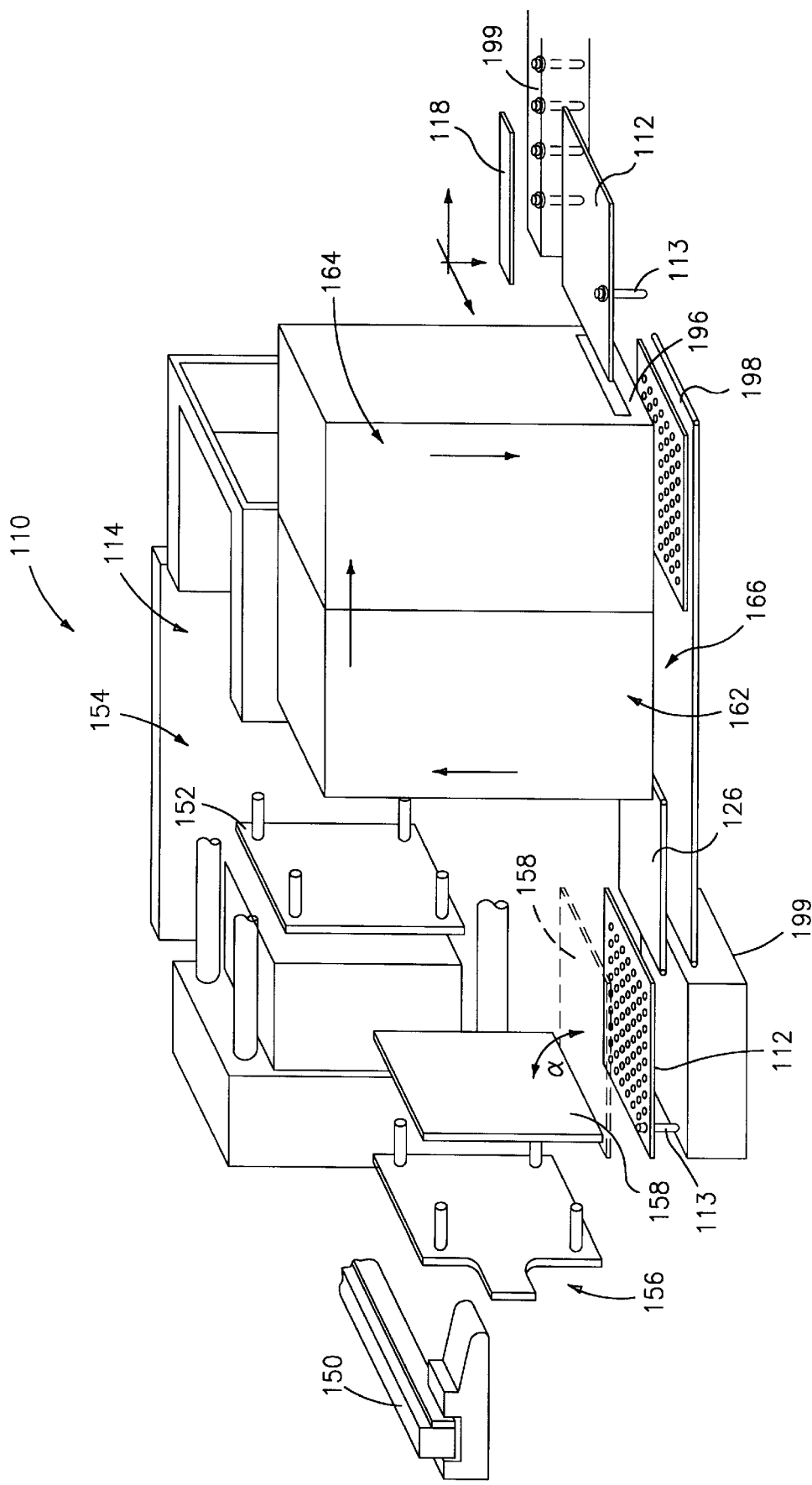
FIG. 10 is a perspective view of another embodiment of the system of the present invention.

Referring now to FIG. 10, an alternative embodiment of the article handling system of the present invention is shown which is designated generally as 110. For the sake of simplifying this description, elements which are similar to system 10 are designated with like numerals and described in further detail only as necessary.

Injection molding machine 114 includes a side entry robot 150, known in the art, for removing preforms via a carrier plate 152 from molding area 154 to position 156 whereat the preforms are transferred to a secondary plate 158. Such a side entry robot and injection molding machine is shown in U.S. Pat. No. Re. 33,237 and U.S. Pat. No. 5,447,426 assigned to the assignee of the present application. The preforms are preferably transferred to secondary plate 158 by means of inflatable plugs, shown in FIG. 11, which plugs 160 are adapted to engage the preforms while they are on secondary plate 158, by engaging the open end of the preform and inflating therein. Plate 158 is operative to rotate through angle α, preferably 90°, from the vertical orientation shown in FIG. 10 to the horizontal orientation, shown by the dotted lines in FIG. 10. The preforms are then released from secondary plate 158 to shuttle plate 112. Shuttle plate 112 is then transferred, similar to as discussed above for system 10, to vertical conveying tower 116. Similar to as discussed above for FIG. 4, multiple shots may be handled and processed by the carrier plate, secondary plate and robot. In this embodiment, conditioning devices are not shown. However, conditioning may optionally be performed in the same manner as discussed above for system 10. In this embodiment, conveying tower 116 includes an upward conveying area 162 and a downward conveying area 164, which acts as a buffer storage area. That is, the upward and downward movement provides sufficient holding time to account for any delays, similar to the purpose of storage rack 22 of system 10. Tracks 126 are operative to move secondary plate 158 to the bottom end 166 of upward conveying area 162. Shuttle plates 112 enter into the upward conveying area 162 of conveying tower 116 and are carried upward through upward conveying area 162 via receiving or shuttle plate engagement devices 128 (shown in FIG. 12), similar to as described above for system 10.

Figure 12:
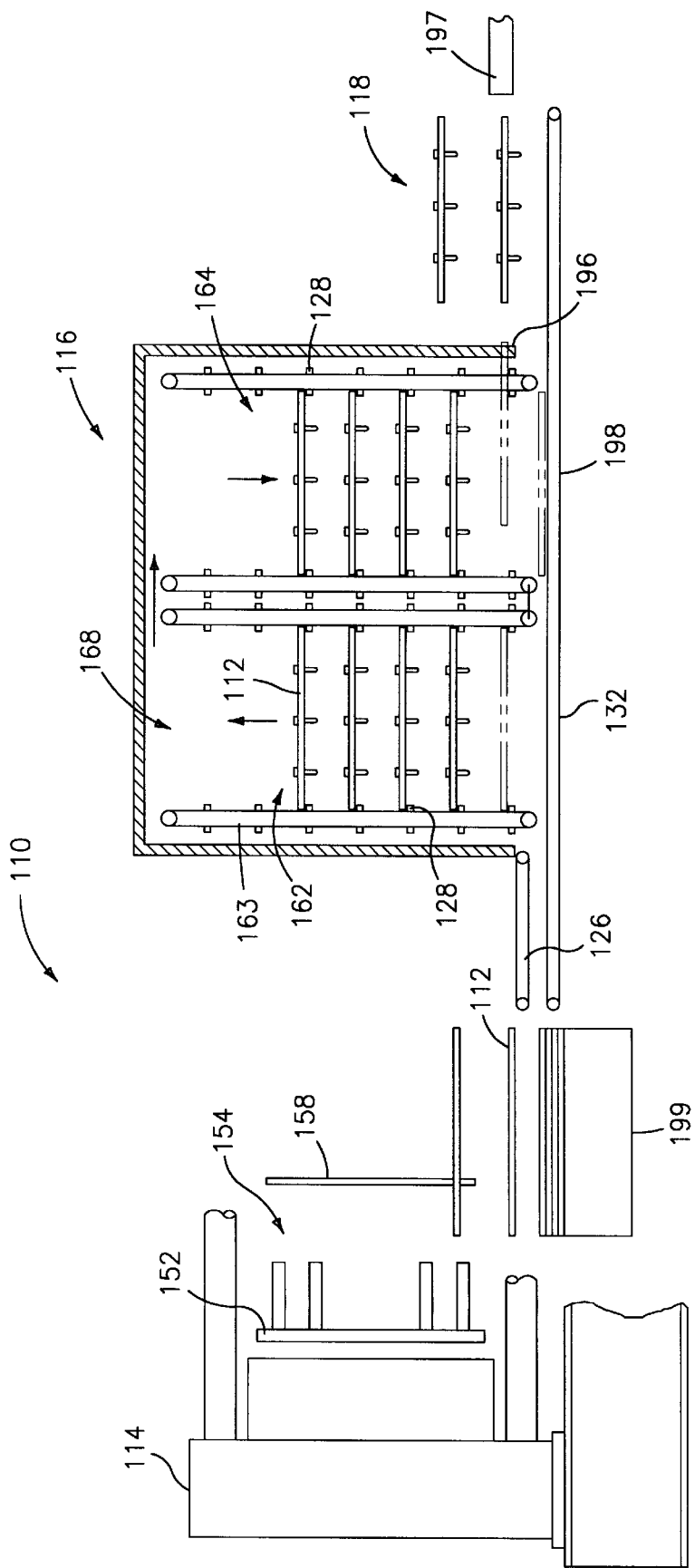
FIG. 12 is an elevational view of the embodiment shown in FIG. 10.
Figure 13B:
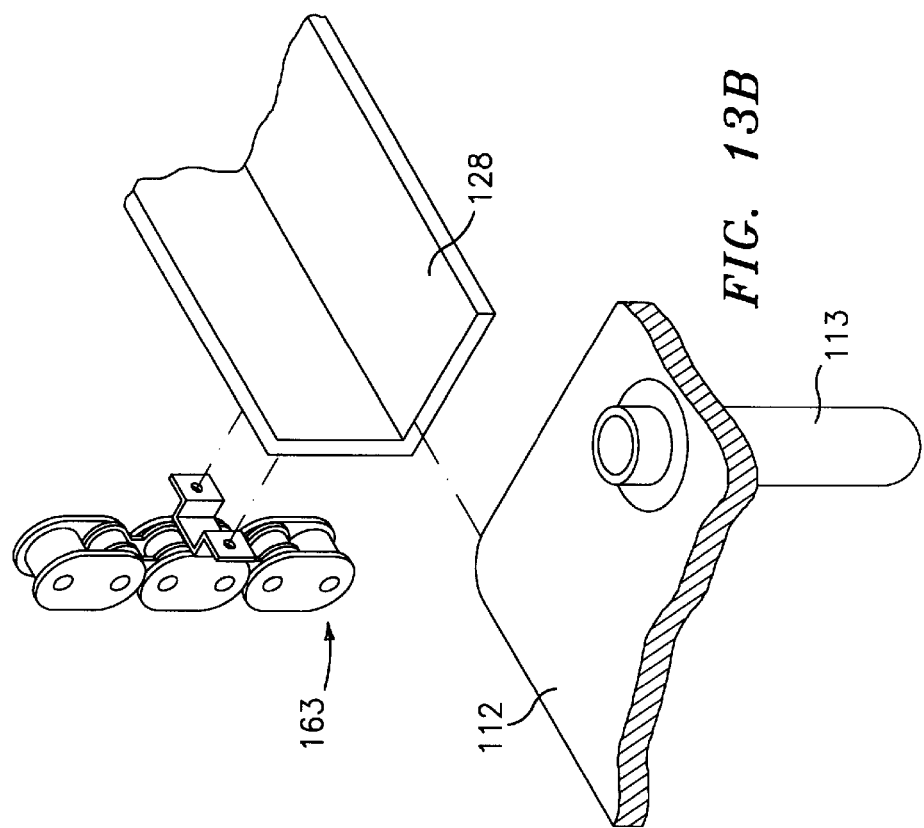
FIGS. 13A and 13B are perspective views of the chain drive used in the vertical conveying towers of the embodiments disclosed herein.
Figure 13A:
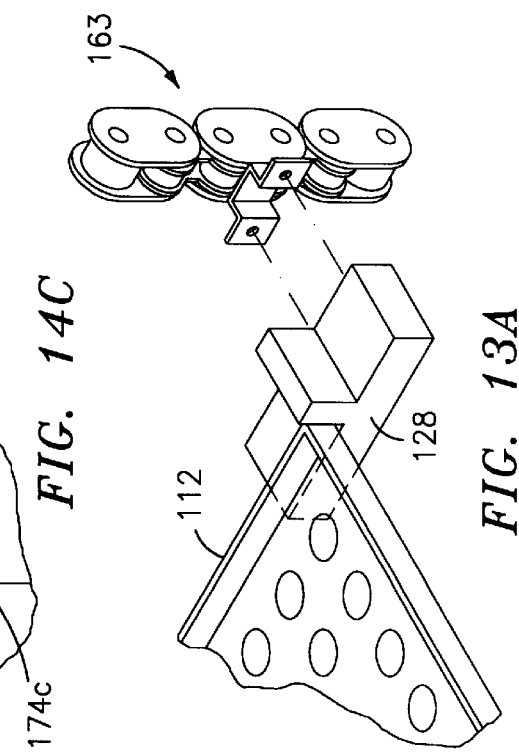

Accordingly, and referring to FIG. 12, shuttle plates 112 are moved upwardly through area 162, and if necessary or desired for time delay, to the upper end 168 thereof, preferably via one of the assemblies shown in FIGS. 13A and 13B, comprising a reciprocal chain link drive 163 and shuttle plate engaging shelve assemblies 128. Engagement devices in the form of shelve assemblies 128 may be in the form of an L-shaped member or the T-shaped member, shown in FIGS. 13A and 13B, attached to chain link drive 163. The embodiments shown in FIGS. 13A and 13B are also applicable to system 10. Shuttle plates 112 are subsequently transferred to the downward conveying area 164, as indicated by the arrow in the cross-sectional view of the conveying areas shown in FIG. 12.

Figure 11:
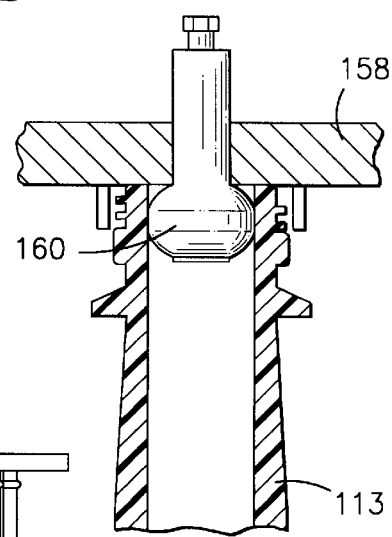
FIG. 11 is a cross-sectional view of a gripping mechanism used with robots used in the embodiments discussed herein.
Figure 14C:
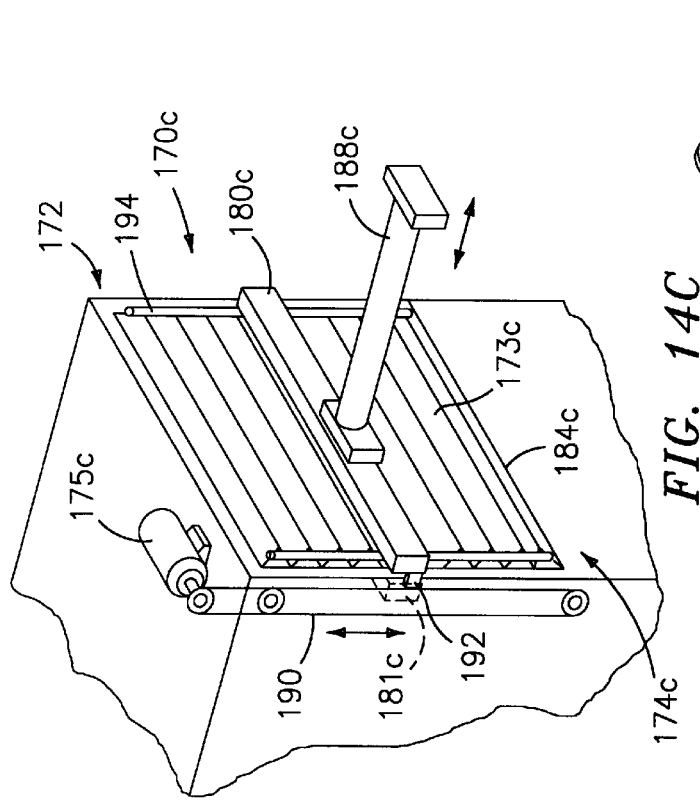

Referring to FIGS. 14A–14C in conjunction with FIG. 11, greater detail of the preferred mechanism 170 for shifting shuttle plates 112 from the upward conveying area 162 to downward conveying area 164, is shown. This embodiment is also the preferred transfer mechanism used with the embodiment discussed above with reference to FIGS. 1–8. As shuttle plates 112 (shown in FIG. 12) move upward in conveying area 162, at any desired height, plate transfer mechanism 170 is operative to push plates 112 (shown in FIG. 12) over to the downward conveying area 164.

FIG. 14A shows a first mechanism 170a for facilitating transfer from upward conveying area 162 to downward conveying area 164. For this device, a pushing mechanism 174a along with an accordion-like seal maintaining wall 173a are moved vertically adjacent an opening 184a in upward conveying area 162 via a motor 175. Motor 175 drives a screw shaft 176 in a screw connection 178, connected with pushing mechanism 174a for moving guide plate 180a up and down along with wall 173a. Pushing mechanism 174a, in this embodiment, is preferably comprised of a pushing member 181a (shown by dotted lines) on the other side of wall 173a in alignment with guide plate 180a. Shafts 182 are movable through guide plate 180a for moving pushing member 181a against the outwardly facing edge (not shown) of shuttle plates 112 (shown in FIG. 12). Accordingly, as the shuttle plates accumulate in upward conveying area 162, pushing member 181a is positioned via motor 175 and screw shaft 176 adjacent the edges (not shown) of the shuttle plates. Pushing member 181a is moved against the edges for forcing shuttle plates 112 (shown in FIG. 12) over to plate engagement devices 128 (shown in FIG. 13) of downward conveying area 164 while wall 173a maintains a seal with respect to opening 184a.

For the embodiment shown in FIG. 14B, instead of a motor 175, a piston and cylinder assembly 186 is used with pushing mechanism 174b to vertically move guide plate 180b adjacent wall 173b and opening 184b and move pushing member 181b adjacent the outwardly facing edges (not shown) of the shuttle plates. Pushing member 181b is then moved against the edges of the shuttle plates via a second piston and cylinder assembly 188 for moving plates over to the engagement devices 128 (shown in FIG. 13) of downward conveying area 164.

Referring to FIG. 14C, a motor 175c is provided for use with pushing mechanism 174c for driving a belt drive 190 connected with guide plate 180c, for moving guide plate 180c and pushing member 181c vertically on linear bearings 192 over tracks 194, extending vertically on tower 116. Accordingly, pushing member 181c is moved adjacent the outwardly facing edges (not shown) of shuttle plates 112 (shown in FIG. 12) and a piston and cylinder mechanism 188c is used to move the shuttle plates from upward conveying area 162 to downward conveying area 164, similar to as described above for FIGS. 14A and 14B.

In each of the embodiments shown in FIGS. 14A–14C, plate transfer mechanism 170 may be used to transfer the shuttle plates over to conveying area 164 at any height on conveying area 162, the choice of which may be dependent on the time delay desired before movement to the blow molder.

Once shuttle plates 112 are moved to downward conveying area 164, they are conveyed downwardly to bottom end area 196, as shown in FIGS. 10 and 12, whereat a robot tooling unit 118 is operable to remove preforms from shuttle plates 112 and place the same into a single-file conveyor 197 for transport to the blow molding machine (not shown). Empty shuttle plates 112 are caused to exit downward conveying area 164 at area 198 and are conveyed back to loading position 199 at injection molding machine 114 via conveying tracks 132, as shown in FIG. 10.

Figure 16A:
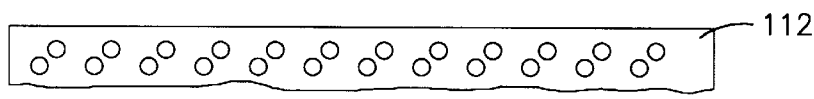
FIGS. 16A and 16B are partial overhead and elevational views of loaded shuttle plates used with the embodiments of FIGS. 1 and 10.
Figure 16B:
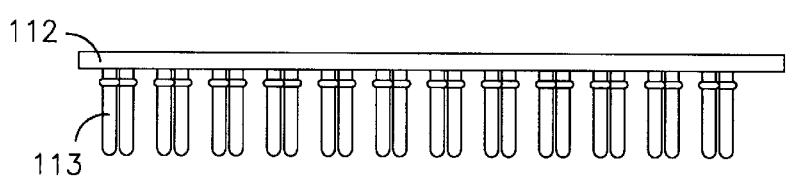
Figure 15:
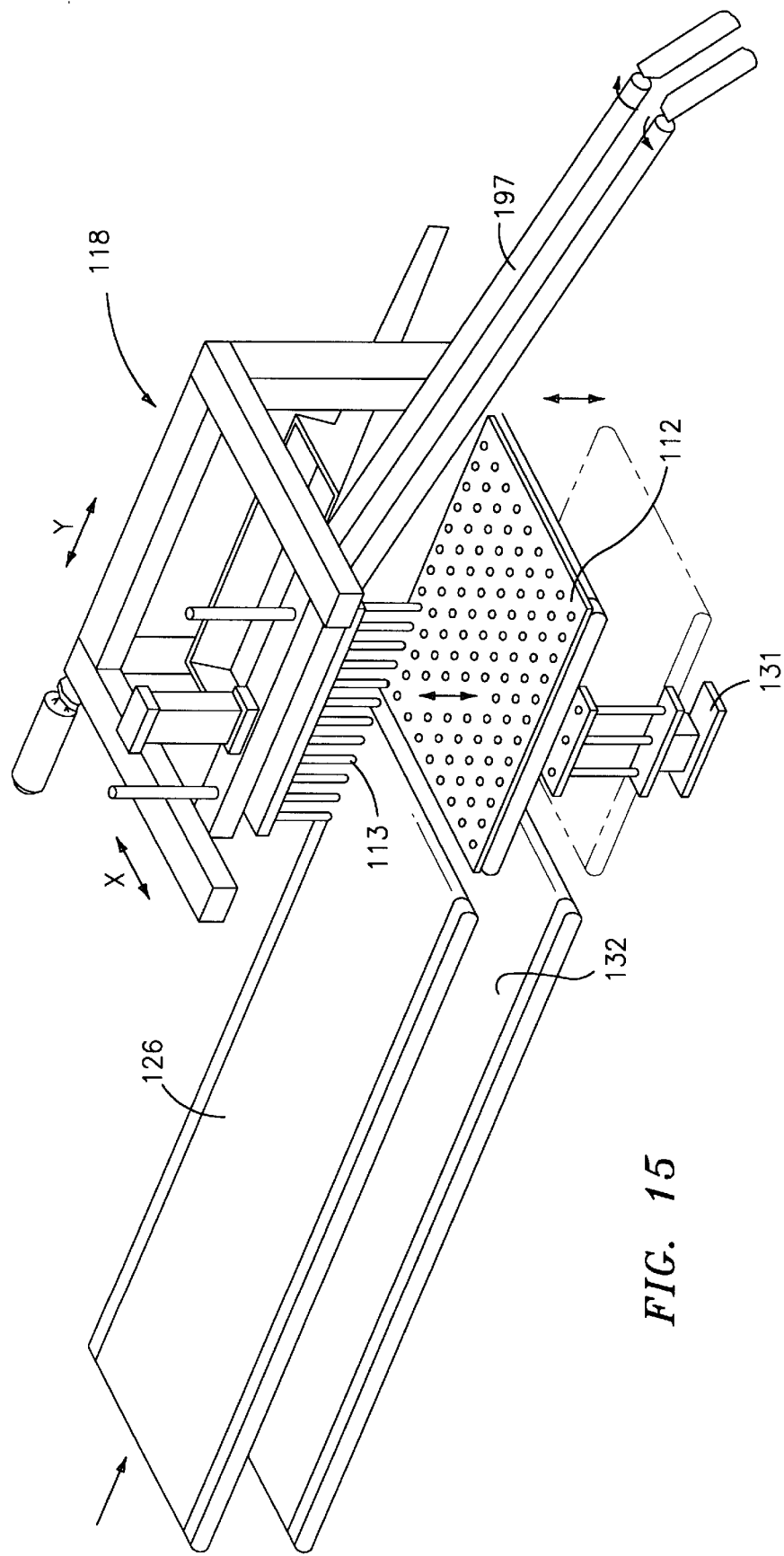
FIG. 15 is a perspective view of the robot, infeed and out feed conveyors, and single file conveyors used with the embodiment shown in FIG. 10.

Referring to FIG. 15, greater detail of robot tooling unit 118 for use with system 10 or 110 for moving preforms into the single-file conveyor 197, is shown. Accordingly, with shuttle plates 112 in position 196 as shown in FIGS. 10 and 12, robot tooling unit 118 is operable to remove the preforms from shuttle plates 112 and put them in the single-file conveyor 197. As discussed above for robot tooling unit 18 of system 10, robot tooling unit 118 preferably has at least two axes of movement, x and y, for lifting at least two rows out of shuttle plates 112, preferably from a staggered layout as shown in FIG. 16A and FIG. 16B. Robot tooling unit 118 preferably uses inflatable plugs 160 shown in FIG. 11, for lifting two rows of preforms out of shuttle plates 12 at a time and releasing the rows separately to single-file conveyor 197, allowing time for the robot head to reposition to the top of the infeeding conveyor tracks 126 for grasping more preforms. Robot tooling unit 118 is also preferably programmed to ensure that the preforms are unloaded in the same sequence that they were loaded into the shuttle plates 112 to ensure the variations in conditioning due to elapsed time between processes is optimized. Similar to as shown in FIGS. 1 and 7, lift 131 is used to move empty shuttle plates 112 to return conveyor 132.

Figure 17:
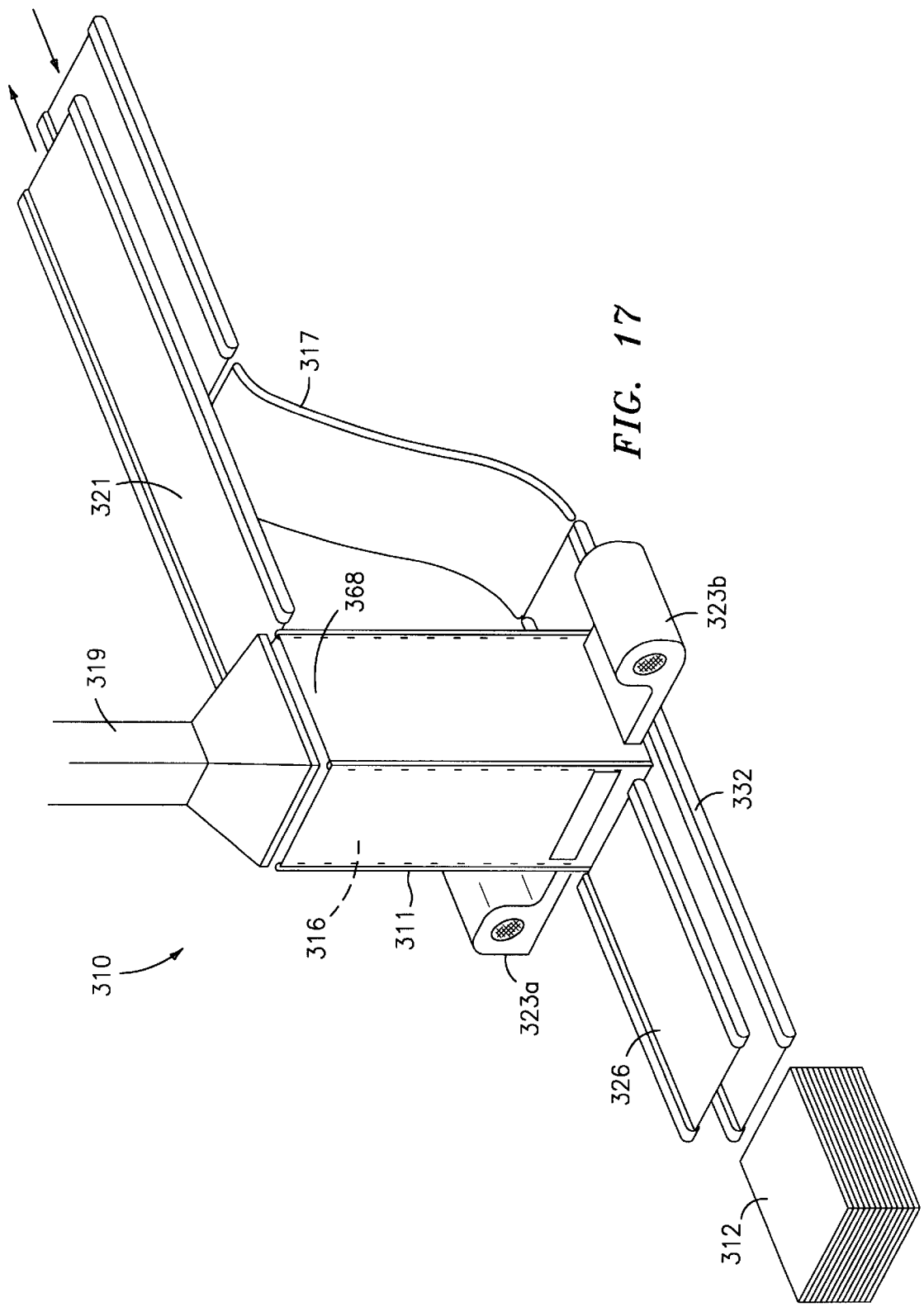
FIG. 17 is a perspective view of an alternative embodiment of the system shown in FIGS. 1–8, wherein a chimney is used for removing conditioned air from the system.

Referring to FIG. 17, system 310 is shown which gives special consideration to conditioning of the preforms. Accordingly, for this embodiment, the vertical conveying tower 316, similar to tower 16 of system 10, is enclosed in a chimney 311 for expelling conditioned air. When conditioning is performed via units 323a and 323b, similar to units 23a and 23b described for system 10, on preforms moving upward in conveying tower 316, heated or otherwise conditioned air within conveying tower 316 is directed via duct 319 and out of the system. Also, in this embodiment, no storage rack is used and shuttle plates 312 are conveyed from top end 368 of vertical conveying tower 316 via exit conveyor 321 to a blow molding machine, not shown. The preforms are removed from shuttle plates 312 at the blow molder and returned via conveyor 317 and tracks 332 to the plate loading position at the injection molding machine, as shown in FIGS. 10 and 12.

Figure 18:
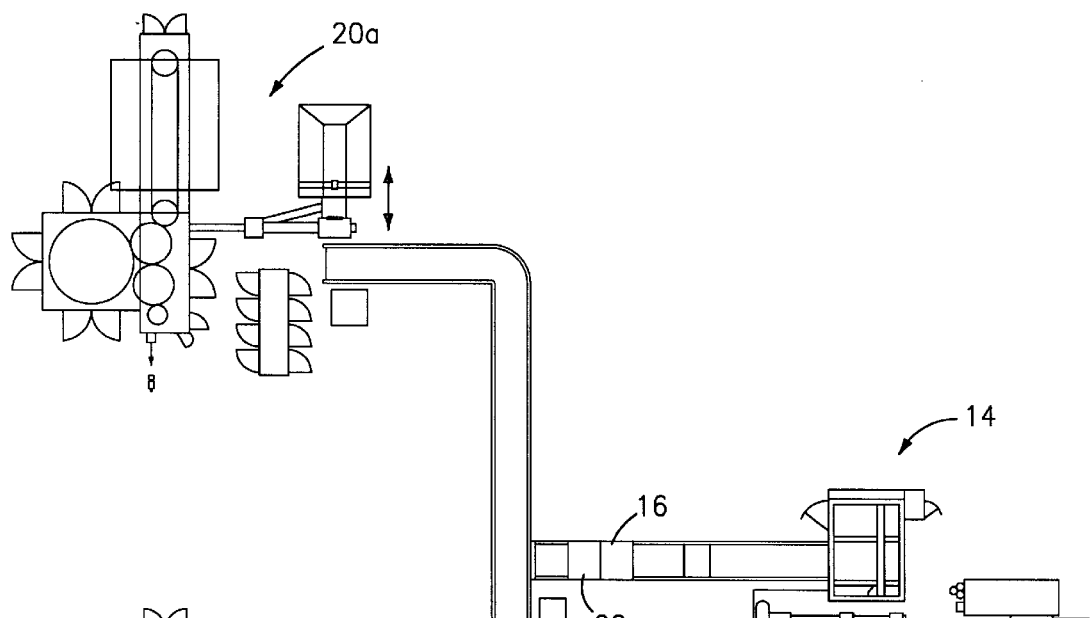
FIG. 18 is an overhead schematic representation of the application of the present invention, wherein one injection molding machine is used to feed two blow molding machines.

FIG. 18 shows an application of the present invention wherein one injection molding machine 14 supplies two blow molding machines 20a and 20b, which injection molding machine 14 uses one conveying tower 16 and optionally, a storage rack 22, as discussed above. The shuttle plates are conveyed directly to the blow molding machines unlike the FIG. 9 embodiment, where the preforms are conveyed in single file. This arrangement can be used where one high capacity injection unit, for example a 96 cavity mold operated at a 20 second cycle, supplies preforms to two smaller blow molders making different parts from the same preform. For example, machine 20a may make a first type of bottle at the rate of 8,000 units per hour and machine 20b may make a different type of bottle at the rate of 8,000 units per hour.

Figure 9:
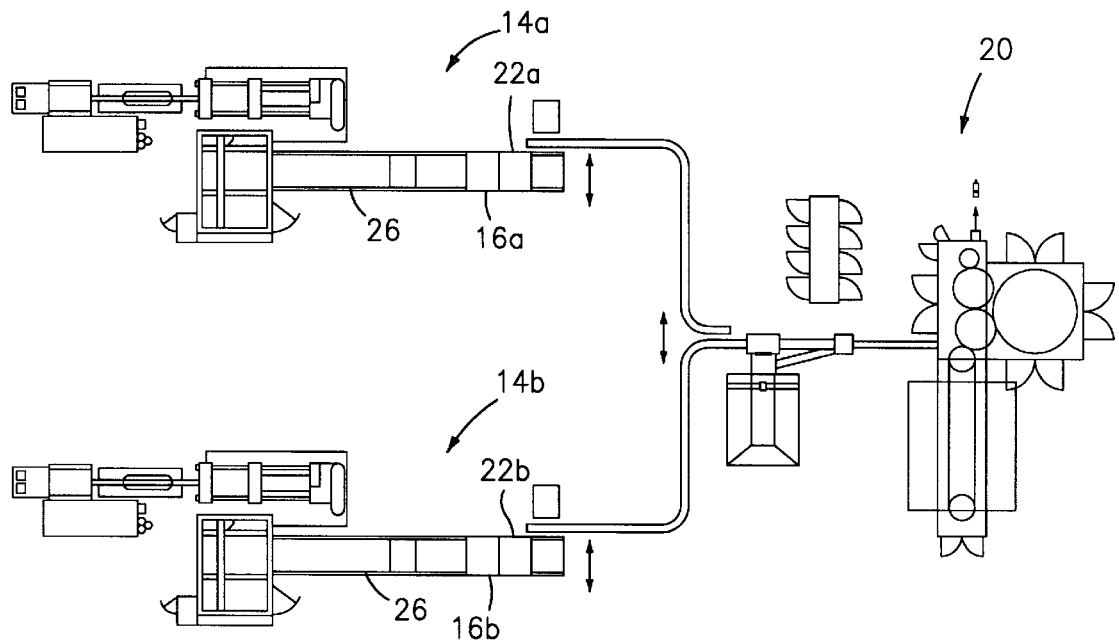
FIG. 9 is an overhead schematic representation of the application of the present invention, wherein the injection molding machines are used to feed a blow molding machine.
Figure 19:
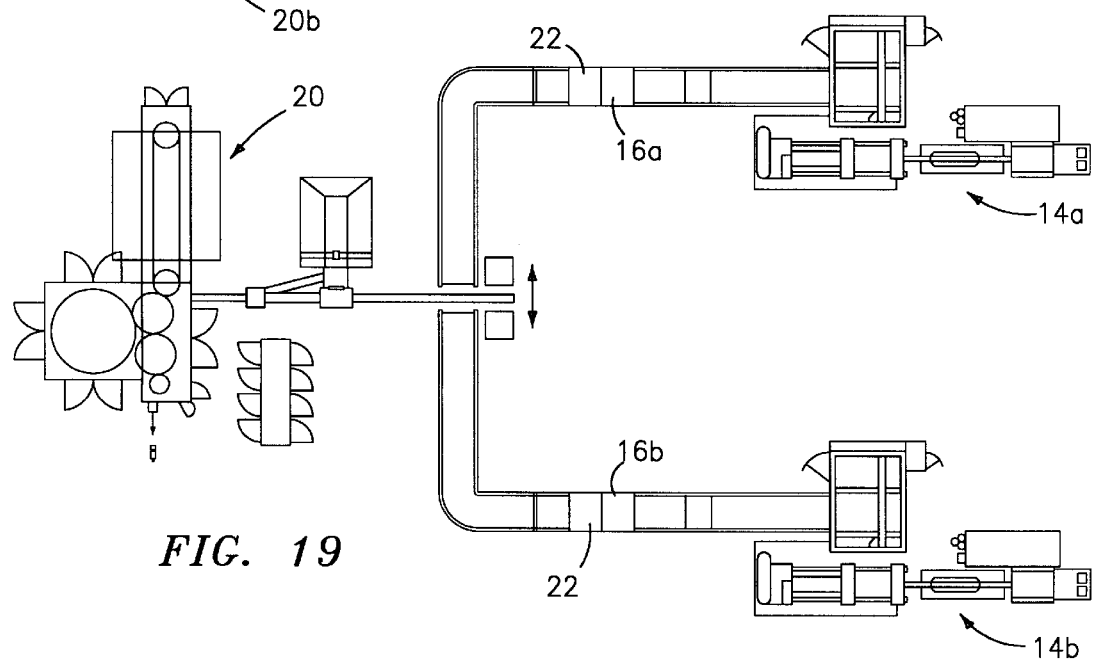
FIG. 19 is an overhead schematic representation of the application of the present invention, wherein two injection molding machines are used to feed preforms to one blow molding machine on shuttle plates.
Figure 20:
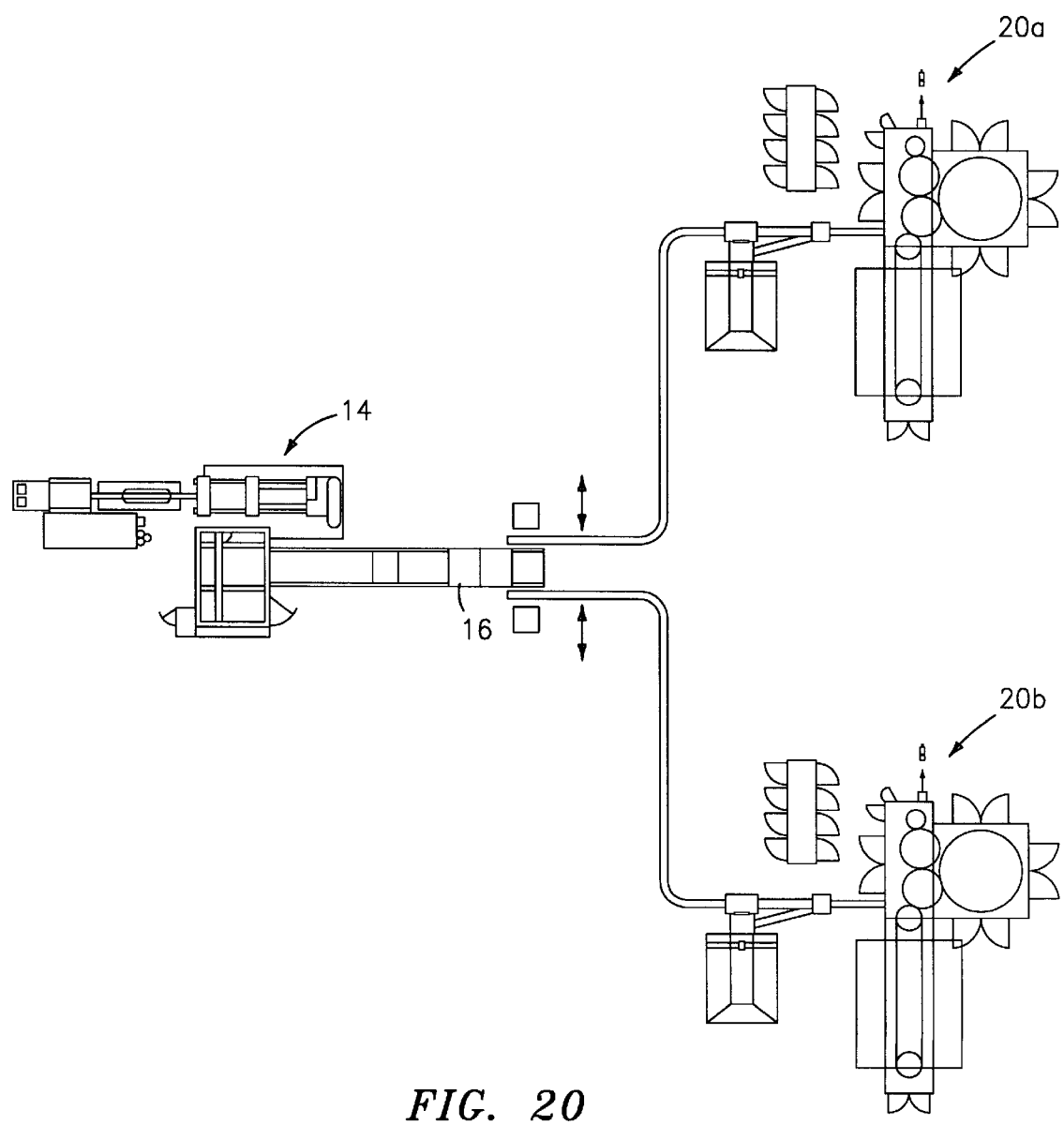
FIG. 20 is an overhead schematic representation of the application of the present invention, wherein one injection molding machine is used to feed preforms to two blow molding machines in single file.

FIGS. 19 and 20 are similar to FIGS. 18 and 9, respectively. In FIG. 19, two injection molding machines 14a and 14b feed a single blow molding machine 20, whereat the preforms are conveyed on the shuttle plates to the blow molding machine instead of in single file. In FIG. 20, one injection molding machine 14 feeds two blow molding machines 20a and 20b, wherein preforms are unloaded and conveyed in single file, instead of on shuttle plates, to the blow molding machines 20a and 20b. Such an embodiment is similar to that shown in FIG. 10 where robot tooling unit 118 is operative to remove preforms from the storage tower and place the same into single-file conveyor 197, except that as shown here, the overall system is represented.

In operation, and referring to FIGS. 1–8, preforms 13 are injection molded by at least one injection molding machine 14. Preferably, injection molding machine 14 is in the form of a turret type injection molding machine, wherein turret block 24 moves molded preforms 13 to station IV for release of the molded preforms into shuttle plates 12, as shown in FIGS. 2 and 3. Referring to FIGS. 1 and 5, shuttle plates 12 move into alignment with the cores on a mold half on turret block 24 and the cores are caused to release preforms 13 into holes 15 in shuttle plates 12. Each shuttle plate 12 includes at least one set of holes 19a and preferably a second set, 19b, arranged for alignment with the mold cores 38 of injection molding machine 14. If two or more sets of holes are provided on each shuttle plate 12, after a first set of holes 19a is loaded with preforms 13, shuttle plate 12 is shifted in the x and/or y directions, as shown in FIG. 5, to align another set of holes, such as set 19b, with mold cores 38 of turret block 24. Once one of the shuttle plates 12 is full, as shown in FIG. 5, the shuttle plate is moved to plate positioning mechanism 27 of vertical conveying tower 16 on tracks 26, whereat shuttle plate engagement devices 28 are designed to lift shuttle plates 12 from mechanism 27. Engagement devices 28 are driven upward via belt drives 30 for moving shuttle plates 12 toward robot tooling unit 18, for subsequent transfer to one of blow molding machine 20 and buffer storage rack 22.

As shuttle plates 12 with preforms 13 thereon are moved upwardly through vertical conveying tower 16, conditioning devices 23a–23d are operative to condition the preforms for subsequent operations, such as blow molding. Due to the arrangement of the preforms in the shuttle plates 12, such that the upper or neck portion of the preform is positioned above shuttle plate 12 and the lower elongated body portion of the preform is located below shuttle plate 12, conditioning devices 23a and 23b are preferably operative to separately condition the neck and body areas to different conditioning parameters. For example, the neck portion of the preform may be cooled by device 23b while the body portion is heated by device 23a.

Once shuttle plates 12 reach top end 37 of conveying tower 16, robot tooling unit 18 is operative to remove shuttle plates 12 from engagement devices 28 and move the preforms from the shuttle plate to blow molding machine 20. If the control system 36 determines that blow molding machine 20 is currently shut down for purposes of repair, cleaning, etc., shuttle plates 12 may be moved to buffer storage rack 22, in the manner as shown in FIG. 14, which storage rack is adapted to accept a plurality of shuttle plates 12 with preforms 13 therein. Storage rack 22 is also preferably in the form of a conveyor, such as conveying tower 16, and is juxtaposed conveying tower 16. Accordingly, if shuttle plates 12 with the preforms 13 thereon are placed into buffer storage rack 22, buffer storage rack 22 is operative to increment downwardly to make room for additional shuttle plates.

While in buffer storage rack 22, preforms 13 in shuttle plates 12' may be subject to further conditioning via additional conditioning devices 33a–33d. Once blow molding machine 20 is back on line, robot tooling unit 18 is preferably operable to begin removing shuttle plates 12' with preforms 13 thereon from the buffer storage rack 22 and move preforms 13 from shuttle plate 12' to the blow molder for the subsequent blow molding operation. Similarly, if control system 36 determines during operation that injection molding machine 14 requires shutdown or has shut down, robot tooling unit 18 under the control of control system 36 is preferably operable to begin removing shuttle plates 12' with preforms 13 thereon from buffer storage rack 22 to blow molding machine 20 for achieving continuous, non-interrupted blow molding. In order to achieve this, it may be preferable to initially fill storage rack 22 before blow molding begins.

After preforms 13 are removed from shuttle plates 12 or 12', the shuttle plates are redirected on return conveying tracks 32 toward injection molding machine 14 for recycling and subsequent retrieval of additional preforms.

Referring to FIG. 9, if multiple injection molding machines 14a and 14b are used, each of injection molding machines 14a and 14b functions as described above for machine 14 and preferably includes its own vertical conveying tower 16 and buffer storage rack 22. Accordingly, robot tooling unit 18 is operable to remove preforms from the conveyors or racks as needed to satisfy the demand of blow molder 20, thereby efficiently using the available cycle time of blow molder 20. In the embodiment shown, preforms are moved in single file to the blow molder.

The operation of the FIGS. 10 and 12 embodiment, system 110, is essentially the same as described above for system 10, with some variations. For system 110, since a turret block is not used, robot 150 is operative to remove the initially molded preforms 113 from injection molding machine 114 and position the preforms, as shown in FIG. 10 and as described above, in shuttle plates 112. Shuttle plates 112 are transported on infeed conveyor tracks 126 to the bottom end of upward conveying area of tower 116. Engagement devices 128 (shown in FIG. 12) are operative to engage shuttle plates 112 and move the same upwardly through area 162, preferably via one of the assemblies shown in FIGS. 13A and 13B. One of the various transfer mechanisms 170, as described in detail above, is operative to push shuttle plates 112 over to the downward conveying area 164 of tower 116 at any desired height along area 162. The actual height of transfer may be dependent upon the amount of time delay desired. That is, the higher the shuttle plates are allowed to move before transfer, the longer the amount of time it will take for these plates to descend, thereby increasing the delay.

Plates 112 are then moved downwardly through tower 116 and caused to emerge from tower 116 at area 196, whereat robot 118, preferably in the form of that shown in FIG. 15, and described in detail above, is operative to remove preforms 113 from shuttle plates 112 and place the same in a single file conveyor 197 for transport to a blow molding machine, not shown. Alternatively, and as described above for system 10, shuttle plates 112 could be transported to the blow molding machine whereat preforms 113 would be removed from the shuttle plates 112 and placed into the blow molder. After shuttle plates 112 are emptied of preforms via robot 118, the shuttle plates are moved via a lift mechanism 131 as shown in FIG. 15, to return conveying tracks 132 for subsequent refilling.

The upward and then downward movement of the preforms in shuttle plate 112 through tower 116 provides for the desired delay of the preforms should a stoppage be required on the blow molding machine. Accordingly, the injection molding machine is able to continue production until tower 116 is full while the blow molding machine is down. That is, similar to buffer storage rack 22 of system 10, downward conveying area 164 allows for storage of a number of preforms. This number is dependent to a degree on the number of shots of preforms in which a single shuttle plate 112 can hold, which as described above is preferably six.

The operation of system 310 shown in FIG. 17 is similar to that described above for system 10, without the use of storage rack 22. Accordingly, shuttle plates 312 are conveyed into tower 316, which is enclosed in chimney 311 and moved upwardly to exit conveyor 321. Exit conveyor 321 is operative to move shuttle plates 312 with preforms therein to a blow molder, not shown. While in tower 316, the preforms on shuttle plates 312 are conditioned via conditioning devices 323a and 323b, similar to as described above for system 10. Exhaust air is directed through and removed from chimney 311 through duct 319. As shown in FIG. 17, shuttle plates 312 are removed from tower 316 at an elevated level which is typically a convenient level for the transport of the shuttle plates to a blow molding machine. Shuttle plates which are emptied of preforms at the blow molding machine via a robot or the like, not shown, are returned to reload at the injection molding machine, not shown, via return conveyor 317. Similar to as described above, the upward movement of shuttle plates 312 through tower 316 acts as a delay mechanism, allowing preform accumulation, to allow continued production by either of the injection molding or blow molding machine should one be shut down.

For all the embodiments described above, preforms may be continuously produced by the injection molding machine and accumulated in towers 16, 116, and 316 should the blow molding machine be off-line and the blow molding machine may continuously remove stored preforms from tower 316 should the injection molding machine be off-line. The length of time for such continuous production for the associated on-line machines is dependent on the preform holding capacity of the combination of the shuttle plates and the tower.

In the FIG. 18 application a high capacity injection molding machine 14 is used with two lower capacity blow molding machines. Tower 16 accumulates shuttle plates, as shown in FIG. 1, and the shuttle plates are then moved from the tower, intact with preforms, to the blow molding machines 20a and 20b. At the blow molding machines, preforms are removed from the shuttle plates via a robot as described above and placed into the blow molder. The empty shuttle plates are then returned to the injection molding machine.

In FIG. 19, two lower capacity injection molding machines 14a and 14b supply a higher capacity blow molder. Towers 16a and 16b accumulate shuttle plates for their respective injection molding machines, as shown in FIG. 1, and the shuttle plates are then moved from the towers, intact with preforms, to the blow molding machine 20. At the blow molding machine, preforms are removed from the shuttle plates and placed into the blow molder. The empty shuttle plates are then returned to the injection molding machines.

In FIG. 20, a high capacity injection molding machine 14 is used with two lower capacity blow molding machines. Tower 16 accumulates shuttle plates, as discussed, and at the injection molding machine, preforms are removed from the shuttle plates and then moved in single file into the blow molding machines 20a and 20b. At the blow molding machines, preforms are removed from the shuttle plates and placed into the blow molder. The empty shuttle plates are then returned to the injection molding machine.

The primary advantage of this invention is that an article handling system and method is provided for use between associated molding machines which increases the efficiency of transfer between the associated machines. Another advantage of this invention is that an article handling system and method for use between associated molding machines is provided, which functions to transport, store and redirect, and optionally condition, initially molded articles, thereby increasing the efficiency of transfer between the associated molding machines and forms improved preforms. Still another advantage of this invention is that a molded article handling system and method for use between injection molding machines and a blow molding machine, is provided which receives initially molded parts from a plurality of injection molding machines and efficiently transfers same to the blow molding machine for allowing the blow molding machine to run at its substantially maximum cycle time. Still another advantage of this invention is that a molded article handling system and method for efficiently transporting initially molded articles from an initial molding machine to a finished molding machine is provided, wherein during transport, the initially molded articles are subject to conditioning. And still another advantage of this invention is that a molded article handling system and method for efficiently transporting initially molded articles between associated molding machines is provided, which also includes a buffer storage area for diverting the initial molded articles from the transferee molding machine, as necessary. And yet another advantage of this invention is that a molded article handling system and method for use between associated molding machines is provided, which allows for the continued operation of each of the associated molding machines should the other one of the associated molding machines have to be shut-down. Still another advantage of this invention is that a molded article handling system and method for transporting molded articles between associated molding machines is provided, which includes means for subjecting first and second portions of the initially molded article to different conditioning parameters for forming molded articles with improved characteristics. And still another advantage of this invention is that a method is provided for forming preforms having substantially no residual stress.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for molding, handling and blow molding preforms, comprising the steps of:

provinding at least one injection molding machine and at least one blow molding machine;

injection molding a first plurality of preforms in injection mold cavities within said injection molding machine, said cavities being arranged in a pattern having a first X direction and a second Y direction;

providing a plurality of preform carrier means, each carrier means including locations to hold at least said first plurality of preforms in said X-Y pattern and also a second plurality of preforms in said X-Y pattern;

transferring said first plurality of preforms into a first of said preform carrier means in said X-Y pattern;

injection molding said second plurality of preforms in said injection mold cavities arranged in said X-Y pattern;

transferring said second plurality of preforms into said first preform carrier means in said X-Y pattern so that said first preform carrier means holds said first and second plurality of preforms;

transferring at least said first preform carrier means including said first and second plurality of molded preforms to a storage means which includes conditioning means for temperature conditioning the molded preforms;

transferring at least a second preform carrier means containing a second set of first and second plurality of molded preforms to said storage means and storing said first and second carrier means with molded preforms in said storage means;

temperature conditioning the molded preforms in said carrier means in said storage means;

transferring temperature conditioned molded preforms from said storage means to said at least one blow molding machine for blow molding;

blow molding said temperature conditioned molded preforms, whereby the steps of injection molding and transferring said carrier means into said storage means may continue even if said step of blow molding is interrupted.

2. The process according to claim 1, further comprising the step of conditioning said molded preforms for blow molding in said blow molding machine prior to transferring to said blow molding machine, said step of conditioning performed in said storage means.

3. The process according to claim 2, wherein said step of conditioning includes the step of maintaining at least a portion of said molded preforms at a temperature such that said at least a portion is not subject to at least one of substantial dimensional change and substantial structural change.

4. The process according to claim 3, wherein said step of maintaining comprises preserving heat energy associated with said molded preforms after molding in said injection molding machine.

5. The process according to claim 4, wherein said molded preforms and said at least a portion thereof exit said injection molding machine at an exit temperature, said step of maintaining comprising heating said body portions at a temperature lower than said exit temperature for achieving slow cooling of said body portions from said exit temperature for forming said at least a portion of said molded preforms substantially free of residual stress.

6. The process according to claim 2, comprising the step of slow cooling said molded preforms for preparing said molded preforms substantially free of residual stress for subsequent operations in said blow molding machine.

7. The process according to claim 2, further comprising the step of exhausting gases created in said step of conditioning.

8. The process according to claim 1, further comprising using a plurality of initial injection molding machines, wherein each of said plurality of initial injection molding machines has a slower output than the output of said blow molding machine, and wherein a combined output volume from said plurality of initial injection molding machines and said storage means approaches an output capacity of said blow molding machine for increasing article processing efficiency.

9. The process according to claim 1, wherein said step of transferring to said storage means includes the step of bypassing said blow molding machine if a delay in the blow molding process occurs.

10. The process according to claim 9, further including the step of accumulating molded preforms in said storage means due to said delay.

11. The process according to claim 10, further including conditioning said accumulated molded preforms in said storage means.

12. The process according to claim 1, including the step of transporting said molded preforms from said storage means to a secondary storage means.

13. The process according to claim 12, wherein said step of transporting further includes retrieving said molded preforms from said secondary storage means.

14. The process according to claim 13, wherein said step of transporting includes placing said molded preforms in single file.

15. The process according to claim 2, wherein said step of conditioning includes the steps of conditioning a first portion of each of said molded preforms and conditioning a second portion of each of said molded preforms.

16. The process according to claim 15, wherein said first portion is a neck portion and said second portion is a body portion.

17. The process according to claim 16, wherein said step of conditioning a first portion comprises cooling said neck portion to a temperature at which said neck portion is not subject to damage in the course of further system handling and wherein said step of conditioning a second portion comprises maintaining said body portion at a temperature such that said body portion is not subject to at least one of substantial dimensional change and substantial structural change.

18. The process according to claim 17, wherein said step of maintaining comprises preserving heat energy associated with said body portion after molding in said injection molding machine.

19. The process according to claim 18, wherein said body portion exits said injection molding machine at an exit temperature, said step of maintaining comprising heating said body portion at a temperature lower than said exit temperature for achieving slow cooling of said body portion from said exit temperature.

20. The process according to claim 1, wherein said molded preforms are held in said storage means on a vertically extending rack.

21. The process according to claim 1, wherein said at least one injection molding machine comprises a turret style injection molding machine.

22. The process according to claim 1, wherein said transferring to a storage means includes the steps of:

moving said molded preforms upwardly in a frame;

shifting said molded preforms horizontally in said frame; and moving said preforms downwardly in said frame.

23. A process according to claim 1, including conditioning said preforms in said storage means such that said preforms are substantially free of residual stress, and moving said preforms in said storage means.

24. The process according to claim 23, wherein said step of conditioning includes the step of maintaining at least a portion of said preforms at a temperature such that said at least a portion is not subject to at least one of substantial dimensional change and substantial structural change.

25. The process according to claim 24, wherein said step of maintaining comprises preserving heat energy associated with said preform after molding in said initial molding machine.

26. The process according to claim 25, wherein said preforms exit said injection molding machine at an exit temperature, said step of maintaining comprising heating said preforms at a temperature lower than said exit temperature for achieving slow cooling of said preforms from said exit temperature for forming said preforms substantially free of said residual stress.

27. The process according to claim 23, wherein said step of conditioning comprises the step of slow cooling said preforms for preparing said preforms substantially free of said residual stress for said blow molding machine.

28. The process according to claim 23, further including the steps of secondarily accumulating said preforms after molding said preforms and causing said preforms to bypass said blow molding machine.

29. The process according to claim 28, further including conditioning said preforms in said step of secondarily accumulating.

30. The process according to claim 23, wherein said step of conditioning in said storage means includes the steps of separately conditioning a first portion of each of said preforms and a second portion of each of said preforms.

31. The process according to claim 30, wherein said first portion is a neck portion and said second portion is a body portion.

32. The process according to claim 31, wherein said step of conditioning a first portion comprises cooling said neck portion to a temperature at which said neck portion is not subject to damage in the course of further system handling and wherein said step of conditioning a second portion comprises maintaining said body portions at a temperature such that said body portion is not subject to at least one of substantial dimensional change and substantial structural change.

33. The process according to claim 32, wherein said step of maintaining comprises preserving heat energy associated said body portions after molding in said injection molding machine.

34. The process according to claim 33, wherein each of said preforms including its body portion exits said injection molding machine at an exit temperature, said step of maintaining comprising heating said body portion at a temperature lower than said exit temperature for achieving slow cooling of said body portions from said exit temperature for causing each of said preforms to be substantially free of residual stress.

35. The process according to claim 1, including transferring at least a third preform carrier means containing a third set of first and second plurality of molded preforms arranged in said X-Y pattern to said storage means and storing said first, second and third carrier means with molded preforms in said storage means.

* * * * *